US012811479B2

(12) United States Patent
Kacperski

(10) Patent No.: US 12,811,479 B2
(45) Date of Patent: Nov. 24, 2026

(54) LORENTZ FORCE MOTOR

(71) Applicant: LF Motor Co., West Chester, PA (US)

(72) Inventor: Alan Kacperski, Willoughby, OH (US)

( * ) Notice: Subject to any disclaimer, the term of this patent is extended or adjusted under 35 U.S.C. 154(b) by 470 days.

(21) Appl. No.: 18/375,738

(22) Filed: Oct. 2, 2023

(65) Prior Publication Data

US 2024/0113608 A1 Apr. 4, 2024

Related U.S. Application Data

(60) Provisional application No. 63/412,699, filed on Oct. 3, 2022.

(51) Int. Cl.

| | |
|---|---|
| ***H02K 41/03*** | (2006.01) |
| ***H02K 3/28*** | (2006.01) |
| ***H02K 11/22*** | (2016.01) |
| ***H02K 15/043*** | (2025.01) |
| ***H02K 41/035*** | (2006.01) |

(52) U.S. Cl.

CPC ........... *H02K 41/0354* (2013.01); *H02K 3/28* (2013.01); *H02K 11/22* (2016.01); *H02K 15/043* (2025.01)

(58) Field of Classification Search

CPC ........ H02K 15/043; H02K 11/22; H02K 3/28; H02K 41/0354

See application file for complete search history.

(56) References Cited

U.S. PATENT DOCUMENTS

| | | | | |
|---|---|---|---|---|
| 11,398,759 | B2 * | 7/2022 | Woo | B62D 5/04 |
| 11,631,525 | B2 * | 4/2023 | Yoshino | H01F 27/2823 336/208 |
| 2004/0212261 | A1 * | 10/2004 | Uchiyama | H02K 11/33 310/67 R |
| 2005/0212644 | A1 * | 9/2005 | Yoshimori | H01F 5/02 336/224 |
| 2020/0328658 | A1 * | 10/2020 | Takahashi | H02K 21/14 |

* cited by examiner

*Primary Examiner* — Leda T Pham

(57) ABSTRACT

Systems, methods, apparatuses, and computer program products for motors, controllers thereof, and systems integrating such motors. For example, a motor can include a single coil cylindrical stator forming a cylinder. The motor can also include a two-pole magnetic rotor disposed around the single coil cylindrical stator and separated from the single coil cylindrical stator by a clearance. The single coil cylindrical stator can include a single wire wound multiple times, forming multiple parallel segments parallel to a common axis of the single coil cylindrical stator and the rotor. In a cross-section perpendicular to the common axis, the single wire can be wound in an alternating pattern from a first side of the cylinder to a second side of the cylinder.

19 Claims, 6 Drawing Sheets

LORENTZ FORCE MOTOR

FIELD

The present disclosure relates to motors and related devices for converting electrical energy to mechanical motion. More particularly, the present disclosure relates to Lorentz motors, control thereof, and associated systems.

BACKGROUND

Broadly speaking, a motor is a mover. The earliest uses of electricity to move things were the electrostatic devices of Benjamin Franklin and others of his time. Faraday is credited with having demonstrated rotary motion that can be produced through the interaction of electricity and a magnetic field. Subsequent work produced motors powered by direct current (DC) or alternating current (AC). Boundless varieties of electric motors have been developed over the last two centuries, most of them employing the discovery behind Faraday's work. More specifically, most practical electric motors today operate on Faraday's law, which describes how electromotive force can result from the interaction of magnetic fields and an electric circuit.

SUMMARY

An embodiment of the present invention is directed to a motor. The motor includes a single coil cylindrical stator forming a cylinder. The motor further includes a two-pole magnetic rotor disposed around the single coil cylindrical stator and separated from the single coil cylindrical stator by a clearance. The single coil cylindrical stator includes a single wire wound multiple times, forming multiple parallel segments parallel to a common axis of the single coil cylindrical stator and the rotor. In a cross-section perpendicular to the common axis, the single wire is wound in an alternating pattern from a first side of the cylinder to a second side of the cylinder.

Another embodiment of the present invention is directed to an electric motor control system of Lorentz force motor. The system includes an H-bridge controller comprising a first controller configured to operate during a first half of a duty cycle of a motor and a second controller configured operate during a second half of the duty cycle of the motor. The system further includes a pair of optical sensors connected to the H-bridge controller and configured to trigger operation of a respective one of the first controller or the second controller. The optical sensors are configured to detect a current shaft position of the motor. The motor includes a single coil cylindrical stator and a two-pole rotor.

An embodiment of the present invention is directed to a method of manufacturing a motor. The method includes forming a single coil cylindrical stator forming a cylinder. The method further includes disposing a two-pole magnetic rotor around the single coil cylindrical stator and separated from the single coil cylindrical stator by a clearance. The formation of the single coil cylindrical stator includes winding a single wire multiple times, forming multiple parallel segments parallel to a common axis of the single coil cylindrical stator and the rotor. In a cross-section perpendicular to the common axis, the single wire is wound in an alternating pattern from a first side of the cylinder to a second side of the cylinder.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale, and the proportion of certain elements may be exaggerated for the purpose of illustration.

DETAILED DESCRIPTION

Figure 1:
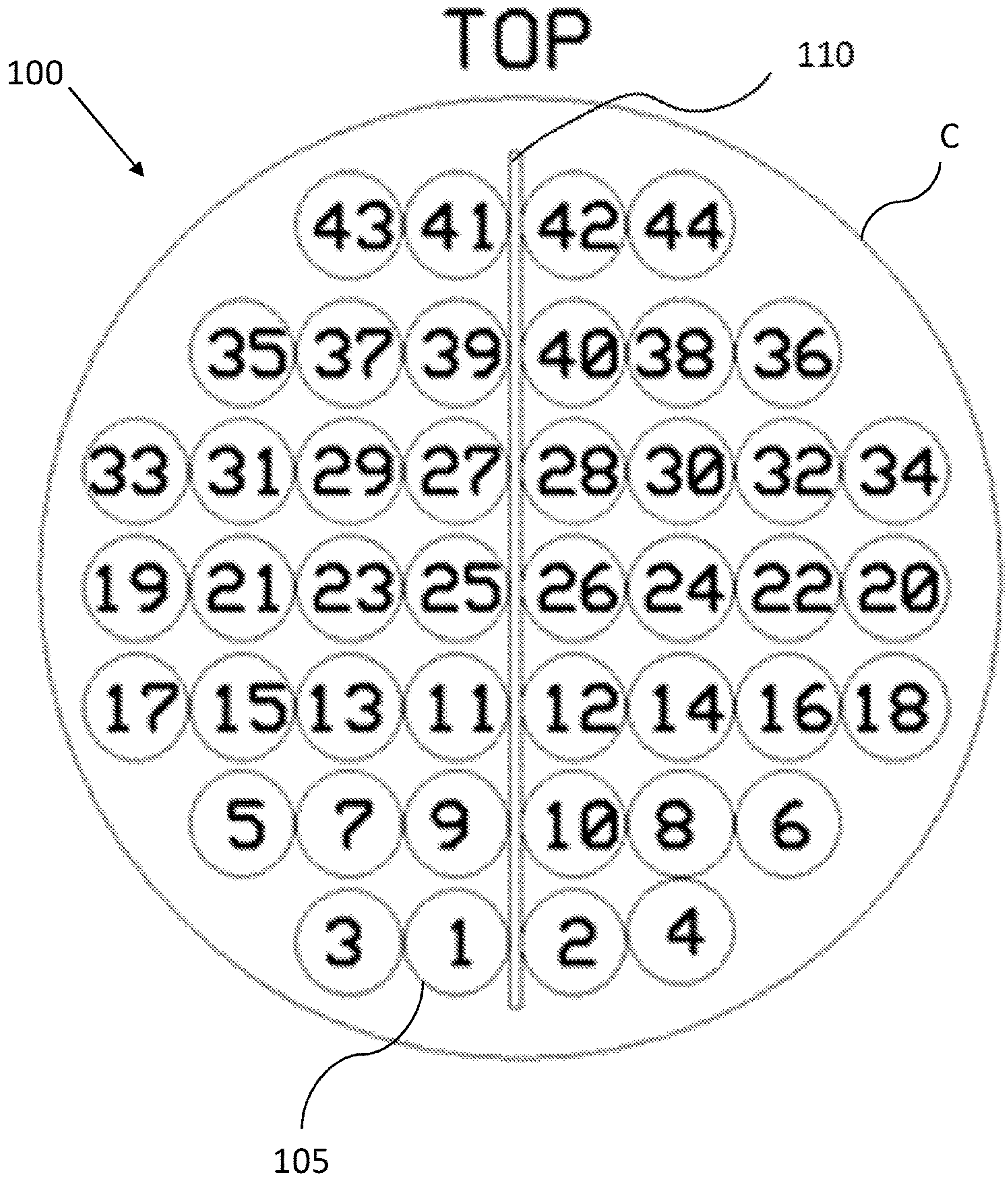
FIG. 1 illustrates a cross-sectional front-end view of a single coil cylindrical stator according to one embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for motors, control systems thereof, and systems integrating such motors, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Electric motors can be characterized according to the electromagnetic principle that converts electric energy to mechanical motion. One type of motor is a Faraday motor. A Faraday motor can be made using coils wrapped around silicon steel or another ferromagnetic core. The coil current magnetizes the steel core, which carries the magnetic flux to the magnetic rotor poles. The rotor can rotate because of the attraction force between two opposite poles or can repel because of the repulsion force between two like poles. If the coil current is reversed at the right time, the steel flux direction also reverses, which in turn can rotate the rotor magnet. Silicon steel has been chosen for the ferromagnetic material of the core because silicon steel has a low level of hysteresis. The hysteresis is considered as a loss, and is considered a cost of switching coil current directions. The steel is laminated to reduce eddy current losses.

In addition to the hysteresis losses and eddy current losses, the main loss in a Faraday motor may be resistance loss due to the resistance of the wire of the coil. The length of the coil may only affect the operating voltage and not the efficiency. Additionally, the magnetic field of the coil may only affect the magnetization of the steel and may have no direct effect on the rotor magnet.

In addition to Faraday's law, there is also Lenz's law, which states that the current induced in a circuit due to a change in a magnetic field is directed to oppose the change in flux and to exert a mechanical force opposing the motion. The mechanical force described by Lenz's law can be referred to as Lorentz force. Lorentz force motors can be used in a variety of implementations, such as in loudspeakers or in vehicle drive systems. In Lorentz force motors, a coil can be placed between two pole pieces in a magnetic circuit. Lorentz force motors may include a gap between the coil and the pole pieces, which may be small. The small gap may help to maintain a nearly uniform magnetic field. In Lorentz force motors, the small cross-sectional area of the conductors in the coil may result in higher resistance and therefore lower efficiency. The length of the wire in the coil can be directly proportional to the torque and efficiency.

Thus, a Lorentz force motor is a distinct type of motor from the Faraday motor. The Lorentz force motor may be constructed by placing a flat coil between two opposite magnet poles where there is a uniform magnetic field. To maintain a uniform field, the magnets may have length and width dimensions much greater than the gap between the magnets. In this arrangement, there may be little space for the coil. The current direction in the coil, the direction of the magnetic flux, and the force between the coil and the magnets in this type of arrangement can be at right angles to each other. The force exerted can be calculated as $F=iL \times B$, where i is the current, L is the length of coil wire, B is the magnetic flux density vector and X indicates a cross-product.

The relative efficiency of the motor can be expressed as $(BL)^2/Re$, where Re is the resistance of the coil wire. Thus, the efficiency can be proportional to the coil length squared. Resistance in coil wire may increase effectively linearly with the length of the coil wire. Thus, as the length of coil wire increases, the efficiency of the motor increases despite the higher losses due to the coil resistance. Accordingly, the efficiency of the motor can effectively be controlled by the length of the coil wire. Certain embodiments, therefore, may be a single coil, two-pole motor, as such an arrangement may provide a longest possible coil configuration. In certain embodiments, there may be no steel core within the coil. Thus, in such embodiments of a motor, steel losses can be avoided.

Certain embodiments of the present invention relate to a brushless motor. More particularly, certain embodiments relate to a radial type brushless motor. For example, certain embodiments relate to a cylindrical, two-pole magnetic Halbach array rotor. The Halbach array rotor may create a uniform magnetic field inside. A stator coil can fill the space inside the cylindrical rotor with a small gap between the rotor and the stator.

FIG. 1 illustrates a cross-sectional view of a single coil cylindrical stator 100 according to certain embodiments of the present invention. The single coil cylindrical stator 100 includes a wire layer 105 that is wound a plurality of times from the bottom of a coil form 110 (also referred herein as a central support element) to the top of the coil form 110. In the illustrated embodiment, the wire layer 105 is a single wire wrapped, wound, or coiled around the coil form. In alternate embodiments, the wire layer 105 may be a plurality of wires wound around the coil form 110. The wire 105 is wound around the coil form 110 such that the cylinder coil stator 100 is substantially cylindrically shaped. The coil form 110 is a substantially rectangular prism central support element that serves as a centrally disposed core to wrap the wire 105 around. The coil form 110 further functions as the central axis of the single coil cylindrical stator 100. The coil form 110 may be comprised of a nonconductive or low conductive insulating material such as fiberglass. The coil form 110 is constructed of material other than laminated steel to reduce potential eddy current and hysteresis losses.

In the illustrated embodiment, the central support element 110 is shown as having a smooth, flat surface on both the left and the right-side faces. In alternate embodiments, the central support element 110 may include a rippled or otherwise textured surface to enhance the grip of the wires on the central support element 110. Furthermore, a stepped or wavy surface may be used to offset adjacent rows of wire segments from each other. For example, the stator 100 may include steps half the width of the wire 105 to more densely pack the wires. Other modifications are also permitted.

Figure 2A:
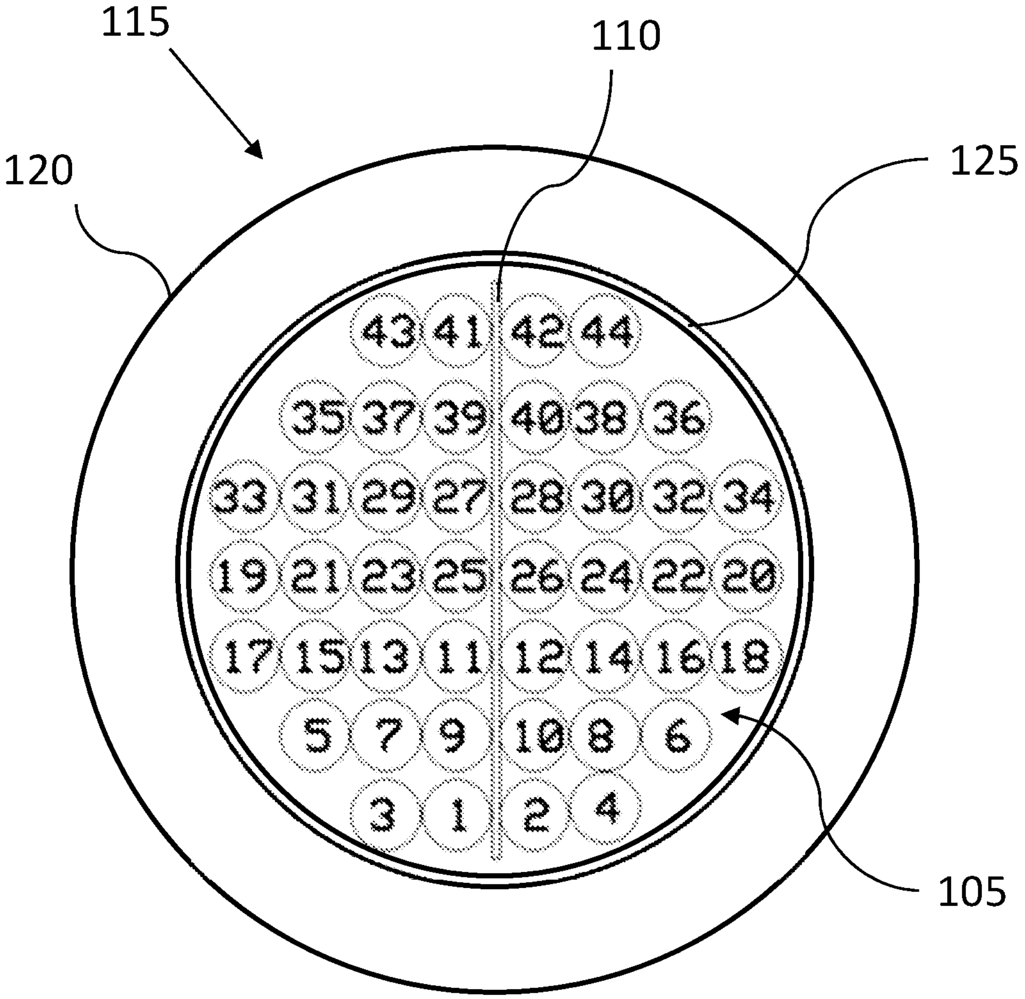
FIG. 2A illustrates a cross-sectional front-end view of a motor including the cylindrical stator of FIG. 1.

As shown in FIG. 1, reference numerals 1 through 44 depict positions of a winding order of the wire 105, according to some embodiments. As stated above, the single coil cylindrical stator 100 comprises a single wire 105 wound a plurality of times. Following the winding order from position 1 to position 44 orients the wire 105 around the coil form 110 to give the single coil cylindrical stator 100 its substantially cylindrical shape. It is to be understood that the circle C disposed around the reference numerals 1 through 44 in FIGS. 1 and 2A represents the substantially circular cross section of the substantially cylindrically shaped coil stator 100 when wrapped. The wire 105 is wound such that it forms a plurality of parallel segments that are parallel to a common axis, wherein the common axis is the central support element 110. In the illustrated embodiment, the wire 105 is wound in an alternating pattern from the first side of the central support element 110 to the second side of the central support element 110. The winding pattern further includes winding the wire from a position proximate to the central support element 110 to an outer edge of the cylindrical stator 100 in a first layer and winding from the outer edge of the cylindrical stator to the central support element in a second layer, wherein the second layer is adjacent to the first layer.

The depicted winding order maximizes separation between conductors to maximize voltage differences. For example, the voltage across the windings of the wire 105 from position 1 to position 44 is the system's greatest voltage differential, whereas the voltage across adjacent positions of the wire 105 is the system's lowest voltage differential. The alternating pattern positions the plurality of parallel segments to maximally spatially separate wire segments at a first end of the coil form from wire segments at a second end of the coil form 110. The wire 105 may further include a thin insulating coating, which may be sufficient to minimize arcing from part of the wire to another part of the wire.

A semispherical form may be used temporarily to hold the wire 105 in place to aid the process of winding the wire 105 from the exterior to interior. For example, the semispherical from may be positioned to hold windings 5 and 6 such that windings 7 and 8 can be wound interior of windings 5 and 6. In alternate embodiments, the stator 100 may be formed from 3D printing. Although not shown, other structural members may be temporarily or permanently included in the single coil cylindrical stator 100 to prevent movement of the windings in use. As one option, the single coil cylindrical stator 100 may be impregnated with resin or epoxy to help maintain the shape of the wound assembly. Tensioning of the wiring by winding may be appropriately made. For example, the winding of 1, 2, 3, and 4 may be performed under constant tension. Tension may be maintained on 1-4 while 5-10 are laid without tension. Then, tension may be applied to 10 and gradually or swiftly released from 4. The remaining layers may be similarly stacked.

Figure 2B:
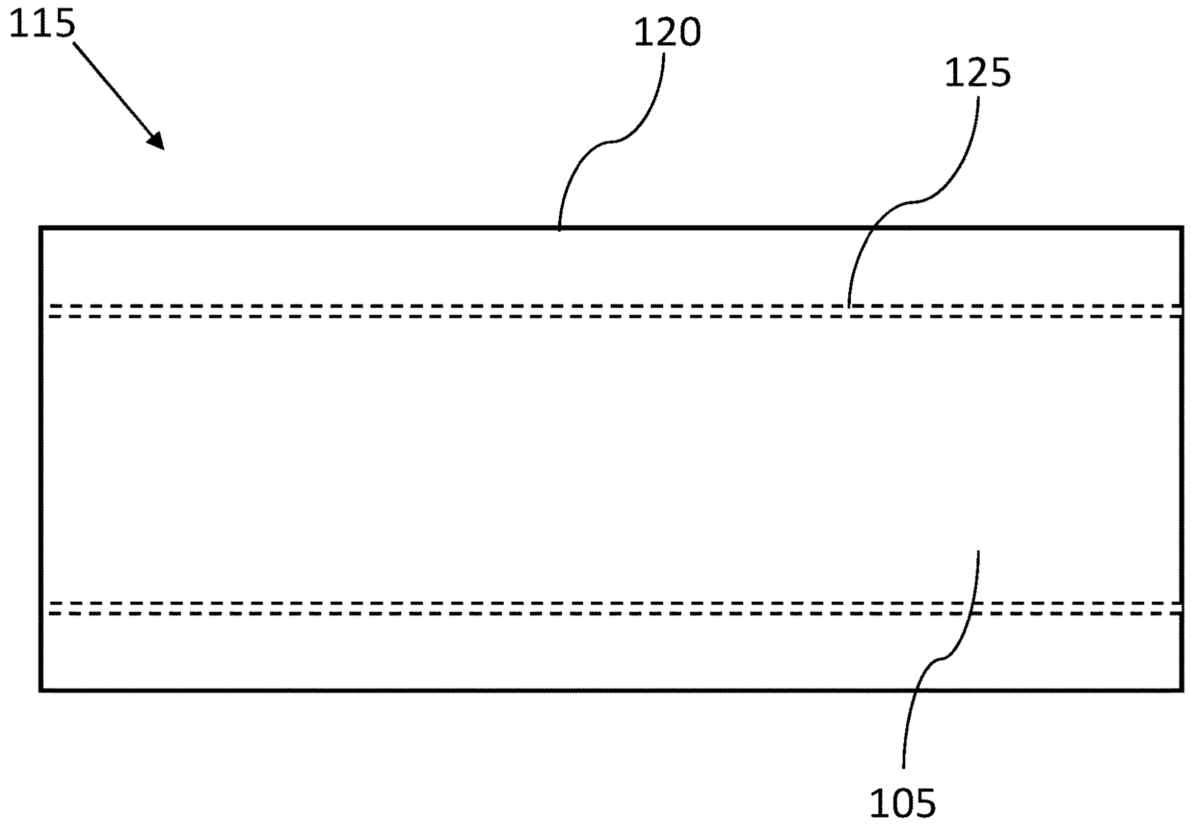
FIG. 2B illustrates a side view of the motor of FIG. 2A.

FIGS. 2A and 2B illustrates a cross-sectional font-end view and a side end view, respectively, of a motor 115 including a two-pole magnetic rotor 120 disposed around the single coil cylindrical stator 100 of FIG. 1. As shown in FIG. 2B, in the side view, only the rotor 120 may be directly visible, while the stator 100 is indicated by broken lines. As shown in the cross-sectional front-end view, the single coil cylindrical stator 100 is separated from the rotor 120 by a clearance 125. The clearance 125 may be a small air gap that provides space for rotation of the rotor 120 and may be configured to accommodate some measure of mechanical disturbance of the rotor 120 in operation. The two-pole magnetic rotor 120 comprises a Halbach array. The Halbach array is configured to concentrate a magnetic field inside the single coil cylindrical stator 100 while minimizing the magnetic field outside of the single coil cylindrical stator 100.

Figure 3:
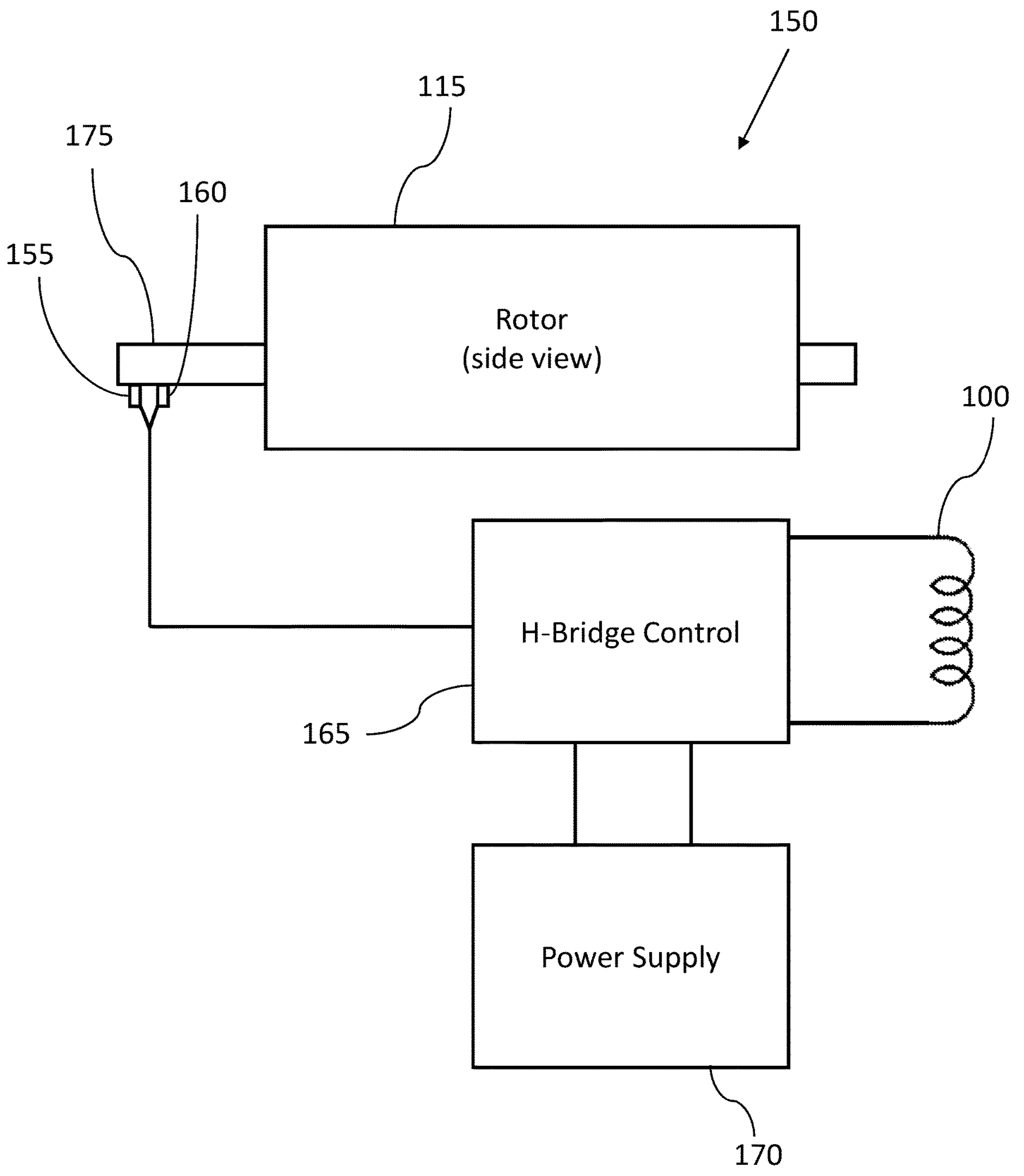
FIG. 3 illustrates a motor system according to one embodiment.

FIG. 3 illustrates a motor system 150 according to certain embodiments of the present invention. The system includes a first shaft position sensor 155 and a second shaft position sensor 160. The rotor 120, or a shaft 175 extending from within the rotor 120, may be colored, patterned, or encoded to aid in determining a current shaft position. The shaft position sensors 155, 160 may be affixed to stator 100, shaft 175, or another fixture external to the rotor 120. The shaft position sensors 155, 160 may each include an optical sensor to detect the position of the rotor 120 or the shaft. The shaft position sensors 155, 160 provide input to a controller 165, which is illustrated as an H-bridge controller 165, however other suitable synchronous motor controllers may be used. The controller 165 may energize the single coil cylindrical stator 100 based on the rotor 120 or shaft position identifiable from the shaft position sensors 155, 160. The controller 165 is configured to apply a first polarity of voltage to the single wire 105 upon the output of the first shaft position sensor 155 and is configured to apply a second polarity of voltage to the single wire 105 upon the output of the second shaft position sensor 165. The controller 165 may connect and disconnect a voltage supplied by the power supply 170. The power supply 170 is a variable voltage power supply. The power supply 170 is configured to supply a voltage to the controller 165, wherein the controller 165 is configured to apply the voltage with a first polarity to the motor 115 during a first portion of a duty cycle 200 of the motor system 150 and to apply the voltage with a second polarity to the motor 115 during a second portion of the duty cycle of the motor.

Figure 4A:
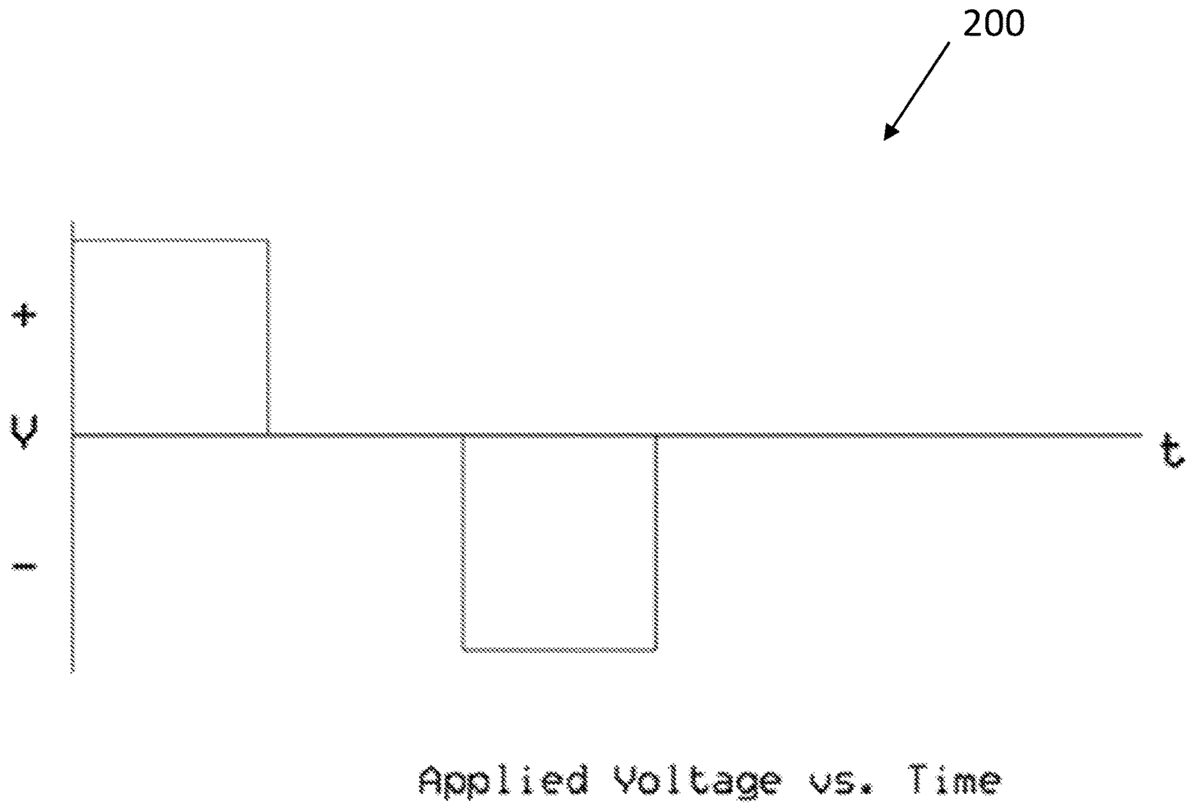
FIG. 4A is a graph illustrating a duty cycle of the motor system of FIG. 3.
Figure 4B:
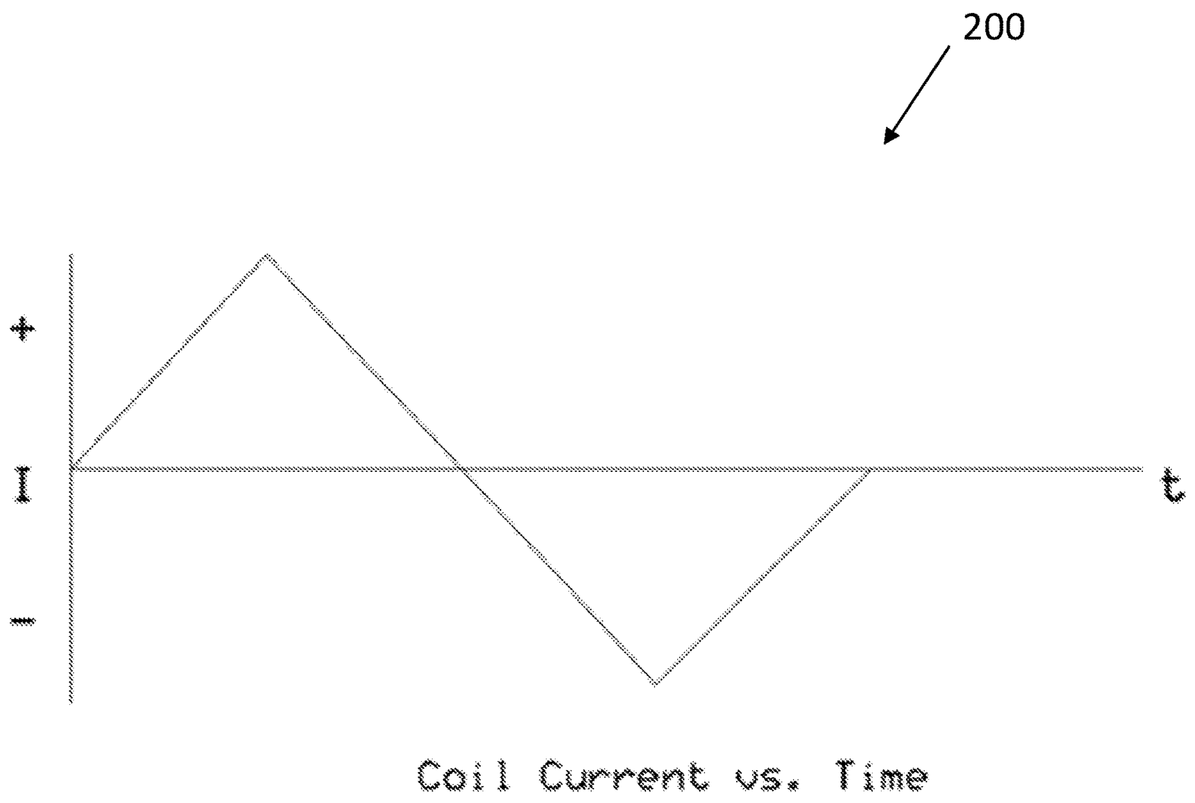
FIG. 4B is another graph illustrating a duty cycle of the motor system of FIG. 3.

FIGS. 4A and 4B are graphs illustrating the duty cycle 200 of the motor 115 for energizing the single coil cylindrical stator 100 over time, according to certain embodiments of the present invention. As discussed above the controller 165 receives a signal from the first or second shaft position sensors 155, 160 to determine a position of the rotor and energize the single coil cylindrical stator 100 based on the signal received. The controller 165 is configured to energize the single coil cylindrical stator 100 two times per revolution. Each energizing revolution can have an opposite polarity to the other and a 50% duty cycle 200. The other 50% of the duty cycle 200 can be for inductive energy recovery. Thus, FIG. 4 illustrates one duty cycle 200 of the motor 115. In this example, the controller 165 can apply a positive polarity to the single coil cylindrical stator 100 during the first quarter of the duty cycle 200, thereby energizing the single coil cylindrical coil 100 during the first quarter of the duty cycle 200. The controller 165 can then ground the voltage during the second quarter of the duty cycle 200, thereby de-energizing the single coil cylindrical stator 100 during the second quarter of the duty cycle 200. During the third quarter of the duty cycle 200, the controller can apply a negative voltage polarity to the single coil cylindrical coil 100, to energize the single coil cylindrical stator 100. During the fourth quarter of the duty cycle 200, the controller 165 can again ground the voltage, to de-energize the single coil cylindrical stator 200.

Various motor controllers can be used. The motor controller for a Lorentz force motor according to certain embodiments of the present invention can be an H-bridge circuit that includes four insulated-gated bipolar transistors (IGBTs) or metal-oxide-semiconductor field-effect transistors (MOSFETs) and four anti-parallel diodes controlled by two half-bridge controllers. The H-bridge controller comprises a first controller configured to operate during a first half of a duty cycle of the motor and a second controller configured operate during a second half of the duty cycle of the motor. One controller in the H-bridge can be for the positive motor polarity. The other controller in the H-bridge can be for the negative motor polarity. Each controller in the H-bridge can be respectively triggered by an optical sensor, for example first shaft position sensor 155 or second shaft position sensor 160. Each controller can turn the magnet rotor 180 degrees. Both controllers can be used to turn the rotor one full turn. The cycle can then repeat.

To deal with the high reactive current in the coil, the H-bridge can be energized for about 90 degrees of rotation. The current in the other 90 degrees of rotation can be returned to the source through the anti-parallel diodes. This reactive current can be in the same direction in the coil. Therefore, the torque can also be in the same direction. In this way, there can be torque on the rotor throughout the cycle even though power is applied during half the cycle. This energy recovery provides increased efficiency.

In view of the foregoing, certain example embodiments provide several technological improvements, enhancements, and/or advantages over existing technological processes and constitute an improvement at least to the technological field of electric motors. Certain embodiments may have various benefits and/or advantages. For example, certain embodiments may provide a more efficient motor with simple control.

Speed control of the motor may be accomplished by a separate controller (not shown), which may regulate the voltage of the power supply. Thus, for example, if higher torque and/or higher shaft speed are desired, the power supply 170 may provide a higher voltage. By contrast, when lower torque and/or lower shaft speed are desired, the power supply 170 may provide a lower voltage.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components that, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a controller, may be configured as circuitry, a computer or a microprocessor, such as single-chip computer element, or as a chipset, which may include at least a memory for providing storage capacity used for arithmetic operation(s) and/or an operation processor for executing the arithmetic operation(s). One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. A motor, comprising:

a single coil cylindrical stator forming a cylinder; and a two-pole magnetic rotor disposed around the single coil cylindrical stator and separated from the single coil cylindrical stator by a clearance, wherein the single coil cylindrical stator comprises a single wire wound a plurality of times, forming a plurality of parallel segments parallel to a common axis of the single coil cylindrical stator and the rotor, wherein in a cross-section perpendicular to the common axis, the single wire is wound in an alternating pattern from a first side of the cylinder to a second side of the cylinder; and wherein the alternating pattern is formed by arranging the plurality of parallel segments to maximally spatially separate wire segments at a first end of the single wire from wire segments at a second end of the single wire thereby maximizing the voltage differences between wire segments.

2. The motor of claim 1, wherein the alternating pattern is formed by winding the single wire from a center line of the cylinder to an outer edge of the cylinder in a first layer and winding the single wire from the outer edge of the cylinder to the center line of the cylinder in a second layer adjacent to the first layer.

3. The motor of claim 1, wherein the two-pole magnetic rotor comprises a Halbach array.

4. The motor of claim 1, further comprising a controller, wherein the controller is configured to energize the single coil cylindrical stator.

5. The motor of claim 4, further comprising a first shaft position sensor, wherein the controller is configured to energize the single coil cylindrical stator based on an output of the first shaft position sensor to the controller.

6. The motor of claim 5, further comprising a second shaft position sensor, wherein the controller is configured to apply a first polarity of voltage to the single wire upon receiving the output of the first shaft position sensor and is configured to apply a second polarity of voltage to the single wire upon receiving an output of the second shaft position sensor.

7. The motor of claim 6, wherein the first shaft position sensor and the second shaft position sensor each comprises an optical sensor.

8. The motor of claim 4, wherein the controller is configured to energize the single coil cylindrical stator with a first voltage polarity during a first quarter of a duty cycle of the motor.

9. The motor of claim 8, wherein the controller is configured to de-energize the single coil cylindrical stator during a second quarter of the duty cycle.

10. The motor of claim 9, wherein the controller is configured to energize the single coil cylindrical stator with a second voltage polarity during a third quarter of the duty cycle.

11. The motor of claim 10, wherein the controller is configured to de-energize the single coil cylindrical stator during a fourth quarter of the duty cycle.

12. The motor of claim 4, wherein the controller is an H-bridge controller.

13. The motor of claim 12, wherein the H-bridge controller comprises a first controller configured to operate during a first half of a duty cycle of the motor and a second controller configured operate during a second half of the duty cycle of the motor.

14. The motor of claim 4, further comprising a power supply configured to supply a voltage to the controller, wherein the controller is configured to apply the voltage with a first polarity to the motor during a first portion of a duty cycle of the motor and to apply the voltage with a second polarity to the motor during a second portion of the duty cycle of the motor.

15. The motor of claim 14, wherein the power supply comprises a variable voltage power supply.

16. An electric motor control system, comprising:

an H-bridge controller comprising a first controller configured to operate during a first half of a duty cycle of a motor and a second controller configured to operate during a second half of the duty cycle of the motor; and a pair of optical sensors connected to the H-bridge controller and configured to trigger operation of a respective one of the first controller or the second controller, wherein the optical sensors are configured to detect a current shaft position of the motor, wherein the motor comprises a single coil cylindrical stator and a two-pole rotor;

wherein the single coil cylindrical stator comprises a single wire wound a plurality of times, forming a plurality of parallel segments parallel to a common axis of the single coil cylindrical stator and the rotor, wherein in a cross-section perpendicular to the common axis, the single wire is wound in an alternating pattern from a first side of the cylinder to a second side of the cylinder; and wherein the alternating pattern is formed by arranging the plurality of parallel segments to maximally spatially separate wire segments at a first end of the single wire from wire segments at a second end of the single wire thereby maximizing the voltage differences between wire segments.

17. The electric motor control system of claim 16, further comprising a power supply configured to provide a voltage to the controller, wherein the first controller is configured to energize the single coil cylindrical stator with a first polarity of the voltage during a first quarter of a duty cycle of the motor and to de-energize the single coil cylindrical stator during a second quarter of the duty cycle, wherein the second controller is configured to energize the single coil cylindrical stator with a second polarity of the voltage during a third quarter of the duty cycle and to de-energize the single coil cylindrical stator during a fourth quarter of the duty cycle.

18. A method of making a motor, comprising:

forming a single coil cylindrical stator forming a cylinder; and disposing a two-pole magnetic rotor around the single coil cylindrical stator and separated from the single coil cylindrical stator by a clearance, wherein the forming of the single coil cylindrical stator comprises winding a single wire a plurality of times, forming a plurality of parallel segments parallel to a common axis of the single coil cylindrical stator and the rotor, wherein in a cross-section perpendicular to the common axis, the single wire is wound in an alternating pattern from a first side of the cylinder to a second side of the cylinder; and wherein the alternating pattern is formed by arranging the plurality of parallel segments to maximally spatially separate wire segments at a first end of the single wire from wire segments at a second end of the single wire thereby maximizing the voltage differences between wire segments.

19. The method of claim 18, wherein the alternating pattern comprises winding from a center line of the cylinder to an outer edge of the cylinder in a first layer and winding from the outer edge of the cylinder to the center line of the cylinder in a second layer adjacent to the first layer.

* * * * *